2,880,225
HALOALKYL ARYL DIPHOSPHATES

William M. Lanham, Charleston, W. Va., assignor to Union Carbide Corporation, a corporation of New York No Drawing. Application November 22, 1955
Serial No. 548,543

14 Claims. (Cl. 260—461)

This invention relates to a new class of compounds and to a process for their preparation. More particularly, this invention relates to certain haloalkyl aryl diphosphates and to a process for their preparation.

The compounds of this invention may be represented by the following formula:

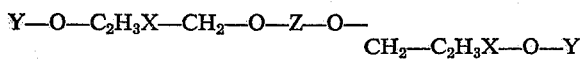

in which X is a halogen atom, particularly chlorine or bromine, Z is a member selected from the class consisting of p,p′-alkylidenediphenyl, phenylene and p,p′-sulfonyldiphenyl radicals and Y is a phosphorus-containing radical selected from the class consisting of

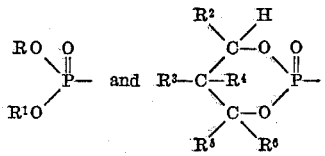

wherein R and R¹ are members selected from the class consisting of alkyl, haloalkyl and aryl radicals and R² through R⁶ are members selected from the class consisting of hydrogen and alkyl groups.

Representative examples of the compounds of this invention are: Tetramethyl 3,3′ - (p-phenylenedioxy)-di-(chloropropyl) diphosphate; tetramethyl 2,2′-(p-phenylenedioxy)-di-(1-chloromethylethyl) diphosphate; tetramethyl 2,3′-(p-phenylenedioxy) - di - (chloropropyl) diphosphate; tetrahexyl 3,3′-(p-phenylenedioxy)-di-(chloropropyl) diphosphate; tetradecyl 3,3′ - (p - phenylenedioxy)-di-(chloropropyl) diphosphate; tetradecyl 2,2′-(p-phenylenedioxy)-di-(1 - chloromethylethyl) diphosphate; tetradecyl 3,3′-(p-phenylenedioxy)-di-(chloropropyl) diphosphate; tetra -(chlorohexyl) 3,3′-(p-phenylenedioxy)-di-(chloropropyl) diphosphate; tetra-(2-ethylhexyl) 3,3′-(p-phenylenedioxy)-di-(chloropropyl) diphosphate; tetramethyl 3,3′ - (p,p′-sulfonyldiphenoxy)-di-(chloropropyl) diphosphate; tetrahexyl 3,3′-(p,p′-sulfonyldiphenoxy)-di-(chloropropyl) diphosphate; tetradecyl 3,3′-(p,p′-sulfonyldiphenoxy)-di-(chloropropyl) diphosphate; tetra-(6-chlorohexyl) 3,3′-(p,p′-sulfonyldiphenoxy)-di-(chloropropyl) diphosphate; tetra-(2-ethylhexyl) 3,3′ - (p,p′-sulfonyldiphenoxy)-di-(chloropropyl) diphosphate; tetra-(6-bromohexyl) 3,3′ - (p,p′-sulfonyldiphenoxy)-di-(chloropropyl) diphosphate; tetramethyl 3,3′-(p,p′-methylenediphenoxy)-di-chloropropyl) diphosphate; tetramethyl 3,3′ - (p,p′-ethylidenediphenoxy) - di - (chloropropyl) diphosphate; tetrahexyl 3,3′-(p,p′-ethylidenediphenoxy)-di-(chloropropyl) diphosphate; tetramethyl 3,3′-(p,p′-isopropylidenediphenoxy)-di-(chloropropyl) diphosphate; tetrahexyl 3,3′-(p,p′ - isopropylidenediphenoxy) - di - (chloropropyl) diphosphate; tetramethyl 3,3′ - (p,p′ - 2 - butylidenediphenoxy)-di-(chloropropyl) diphosphate; tetrahexyl 3,3′-(p,p′-2-butylidenediphenoxy) - di - (chloropropyl) diphosphate; tetra (chloromethyl) 3,3′-(p,p′ - 2 - butylidenediphenoxy)-di-(chloropropyl) diphosphate; tetra-(chlorohexyl) 3,3′-(p,p′-2-butylidenediphenoxy)-di-(chloropropyl) diphosphate; tetra-(bromohexyl) 3,3′-(p,p′-2-butylidenediphenoxy)-di-(chloropropyl) diphosphate; tetramethyl 3,3′-(p-phenylenedioxy) - di - (bromopropyl) diphosphate; tetrahexyl 3,3′-(p-phenylenedioxy)-di-(bromopropyl) diphosphate; tetra-(2-ethylhexyl) 3,3′-(p-phenylenedioxy)-di-(bromopropyl) diphosphate; tetramethyl 3,3′ - (p,p′-sulfonyldiphenoxy)-di-(bromopropyl) diphosphate; tetra-(2-ethylhexyl) 3,3′-(p,p′ - sulfonyldiphenoxy)-di-(bromopropyl) diphosphate and tetramethyl 3,3′-(p,p′-methylenediphenoxy)-di-(bromopropyl) diphosphate.

Additional examples of the compounds of this invention are: 2,2′-[3,3′-(p,p′-methylenediphenoxy)-di- (chloropropoxy)] bis(2-oxo-1,3,2-dioxaphosphorinane); 2,2′-[3,3′-(p,p′-methylenediphenoxy) - di - (chloropropoxy)] bis(4-methyl-2-oxo-1,3,2-dioxaphosphorinane); 2,2′-[3,3′-methylenediphenoxy)-di-(chloropropoxy)] bis(5-butyl-5-ethyl-2-oxo-1,3,2-dioxaphosphorinane); 2,2′-[3,3′ - (p,p′-methylenediphenoxy) - di - (chloropropoxy)] bis(5-methyl - 2-oxo-5-propyl-1,3,2-dioxaphosphorinane); 2,2′-[3,3′-(p,p′-methylenediphenoxy) - di - (chloropropoxy)] bis (4,6-dimethyl-2-oxo-1,3,2-dioxaphosphorinane); 2,2′-[3,3′-(p,p′-methylenediphenoxy)-di-(chloropropoxy)] bis (4,4,6 - trimethyl-2-oxo-1,3,2-dioxaphosphorinane); 2,2′-[3,3′-(p,p′-methylenediphenoxy)-di-(chloropropoxy)] bis (5,5-dimethyl - 2 - oxo-1,3,2-dioxaphosphorinane); 2,2′-[3,3′-(p,p′-methylenediphenoxy)-di-(chloropropoxy)] bis (5,5-diethyl-2-oxo-1,3,2-dioxaphosphorinane); 2,2′-[3,3′-(p,p′-methylenediphenoxy)-(di-choloropropoxy)] bis(5, 5 - dimethyl-4-isopropyl-2-oxo-1,3,2-dioxaphosphorinane); 2,2′-[3,3′-(p,p′-methylenediphenoxy) - di - (chloropropoxy)] bis(5-butyl-2-oxo-4-pentyl-1,3,2-dioxaphosphorinane); 2,2′-[3,3′-(p,p′-methylenediphenoxy)-di-(chloropropoxy)] bis (5-butyl-5-methyl-2-oxo-1,3,2- dioxaphosphorinane); 2,2′ - [3,3′ - (p,p′-ethylidenediphenoxy)-di-(chloropropoxy)] bis (2-oxo-1,3,2-dioxaphosphorinane); 2,2′-[3,3′-(p,p′-isopropylidenediphenoxy) - di - (chloropropoxy)] bis (4 - methyl-2-oxo-1,3,2-dioxaphosphorinane; 2,2′-[3,3′-(p,p′-2-butylidenediphenoxy)-di-(chloropropoxy)] bis(2 - oxo-1,3,2-dioxaphosphorinane); 2,2′-[3,3′ - (p,p′ - 2 - butylidenediphenoxy)-di-(chloropropoxy)] bis(4 - methyl-2-oxo-1,3,2-dioxaphosphorinane); 2,2′-[3,3′-(p,p′-2-butylidenediphenoxy) - di - (chloropropoxy)] bis(5 - butyl-5-hexyl-2-oxo-1,3,2-dioxaphosphorinane); 2,2′-[3,3′-(p,p′-2-butylidenediphenoxy)-di-(chloropropoxy)] bis(5,5-dimethyl-2-oxo-1,3,2-dioxaphosphorinane); 2,2′-[3,3′-(p,p′-2-butylidenediphenoxy)-di-(chloropropoxy)] bis(4,4,6 - trimethyl-2-oxo-1,3,2-dioxaphosphorinane); 2,2′ - [3,3′-(p,p′-2-butylidenediphenoxy)-di-(chloropropoxy)] bis(5-butyl-2-oxo-4-pentyl-1,3,2-dioxaphosphorinane); 2,2′-[3,3′-(p,p′-2-butylidenediphenoxy)-di-(chloropropoxy)] bis(4,6-dimethyl-2-oxo-1,3,2-dioxaphosphorinane); 2,2′-[3,3′-(p,p′-2-butylidenediphenoxy)-di-(chloropropoxy)] bis(5,5-dimethyl-4-isopropyl-2-oxo-1,3,2-dioxaphosphorinane) and 2,2′-[3,3′-(p,p′-2-butylidenediphenoxy)-di-(chloropropoxy)] bis(5,5-diethyl-2-oxo-1,3,2-dioxaphosphorinane).

The compounds of this invention can be prepared by reacting a diepoxy compound with a stoichiometric amount or an excess of a disubstituted monohalophosphate in accordance with the following general equation:

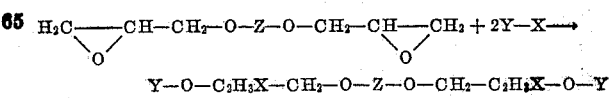

Y—O—C₂H₃X—CH₂—O—Z—O—CH₂—C₂H₃X—O—Y in which X is a halogen atom, Z is a member selected from the class consisting of p,p′-alkylidenediphenyl, phenylene and p,p′-sulfonyldiphenyl radicals and Y is a phosphorus-containing radical selected from the class consisting of

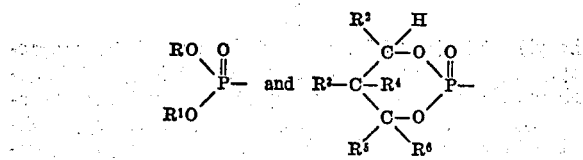

wherein R and R' are members selected from the class consisting of alkyl, haloalkyl and aryl radicals and $R^2$ through $R^6$ are members selected from the class consisting of hydrogen and alkyl groups.

The reaction can be conducted at temperatures of from about −10° C. to about 125° C. but is preferably conducted at a temperature of from about 50° C. to about 90° C. A particularly preferred temperature is about 70° C., at which temperature the reaction proceeds smoothly and with the evolution of heat.

Although the reaction can be conducted under pressures of from about 1 p.s.i.a. to about 150 p.s.i.a., atmospheric pressure is preferred.

Suitable catalysts for the reaction are the halides of zirconium, aluminum and titanium. The preferred catalyst is titanium tetrachloride, because it is highly active and easily handled.

The amount of catalyst employed can vary considerably. As little as 0.2 percent by weight of the catalyst, based upon the phosphorus compound, is sufficient for the reaction to proceed. A catalyst concentration of from 0.7 to 2 percent is preferred for large scale operations, but larger amounts can be used. Either the technical grade or the commercially pure grade of the catalytic compound can be employed.

The reaction proceeds readily and the addition may be completed in about 1 hour. It is preferred to heat the reactants for a period of at least 5 hours. However, the reactants may be heated for longer or shorter periods of time, depending upon such factors as the actual reactants used, the size of the charge and the cooling media employed.

After completion of the reaction the crude reaction products can be purified by washing with about an equal volume or more of an aqueous solution, containing from about 5 to 10 percent by weight of trisodium citrate, sodium potassium tartrate or disodium tartrate in order to convert the catalyst to a water soluble complex and to hydrolyze any excess of the monohalophosphate reactant. An aqueous slurry containing 2 to 10 percent by weight of calcium or barium carbonate may be used instead of the aqueous solution. Following this treatment, the reactant mixture can be washed with about an equal volume or more of water or, when the monohalophosphate reactant is a heterocyclic compound, with an aqueous solution of sodium hydroxide followed by a water wash. The washed product can be freed from water by distillation. The desired product can also be secured directly by fractional distillation under vacuum.

The diepoxy compounds used as starting materials in the above-described process can be prepared by known procedures in accordance with the following general equation, wherein X is a halogen atom and Z is a member selected from the class consisting of p,p'-alkylidenediphenyl, phenylene and p,p'-sulfonyldiphenyl radicals:

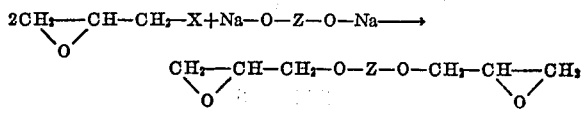

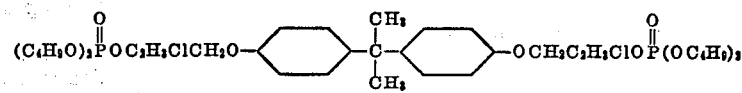

The following examples are illustrative:

*Example 1*

A tetrabutyl p,p'-isopropylidenediphenoxy-di-(chloropropyl) diphosphate represented by the structural formula:

was prepared as follows:

To a solution of 1.0 g. of titanium tetrachloride and 120 g. (0.525 mol) of dibutyl chlorophosphate was added, dropwise, 85 g. (0.25 mol) of the diglycidyl ether of p,p'-isopropylidenediphenol. This addition was made at such a rate that it was possible to maintain the reaction temperature at 70° C. without either heating or cooling the reaction mixture. After the addition the reaction mixture was maintained at 70° C. for 6 additional hours, neutralized using 300 g. of 10 percent aqueous trisodium citrate, washed twice with 300 cc. portions of water, and stripped by distillation at a kettle temperature of 120° C. at 3 mm. Hg. There was obtained 151 g. of clear, pale yellow, viscous liquid as the residue product. It was found to have the following properties: acidity=0.11 cc. of N base/g., salt=0.005 cc. of N $HClO_4$/g., $n_D^{30}$=1.5039, percent Cl=8.57 (theory=8.89), molecular weight=770 (theory=797.7), and yield=75 (based on the diepoxy compound), percent P=7.60 (theory=7.77).

A tetrabutyl p,p'-isopropylidenediphenoxy-di-(bromopropyl) diphosphate can also be prepared in this manner.

*Example 2*

A tetra-(2-chloroethyl) p,p'-2-butylidenediphenoxy-di-(chloropropyl) diphosphate represented by the structural formula

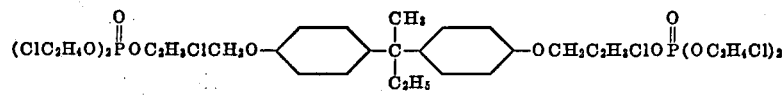

was prepared by the dropwise addition of 96 g. of the diglycidyl ether of 2,2-bis(4-hydroxyphenyl)butane (92.1% material by epoxy analysis) to an agitated solution of 1.0 g. of titanium tetrachloride and 0.525 mol of di-(2-chloroethyl) chlorophosphate. It was necessary to cool the reaction mixture throughout the addition in order to maintain the temperature at 70° C. After the addition the reaction mixture was heated at 70° C. for 6 additional hours, diluted with 200 cc. of benzene, neutralized using 1000 cc. of 10% aqueous trisodium citrate, washed with water, and stripped by distillation at 70° C./<1 mm. Hg. There was obtained 192 g. of yellow, very viscous residue having the following properties: acidity=0.006 cc. of N base/g., salt=0.03 cc. of N $HClO_4$/g., percent Cl=23.76 (theory[1]=24.54), percent yield=84 (based on the diepoxy compound), percent P=7.29 (theory[1]=7.15).

---

[1] The theoretical chlorine and phosphorus contents are based on the assumption that the impurity present in the epoxide starting material was present in the final product. Thus, in this case, the impurity in the final product was assumed to be approximately 7.6 grams (100−92.1=7.9% which is equivalent to 0.079×96 g.=7.6 g.)

Example 3

A tetra-(2-chloroethyl) p,p'-ethylidenediphenoxy-di-(chloropropyl) diphosphate represented by the structural formula:

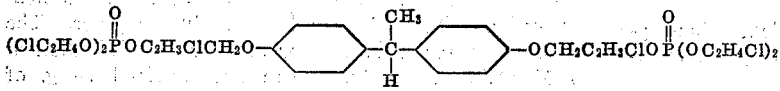

was prepared by the dropwise addition of 89 g. of the diglycidyl ether of alpha, alpha-bis(4-hydroxyphenyl)-ethane (92.2% by epoxy analysis) to an agitated solution of 1.0 g. of titanium tetrachloride and 0.525 mol of di-(2-chloroethyl) chlorophosphate. It was necessary to cool the reaction mixture throughout this addition in order to maintain the temperature at 70° C. After the addition the reaction mixture was maintained at 70° C. for 6 additional hours, diluted with 200 cc. of benzene, neutralized using 1000 cc. of 10% aqueous trisodium citrate, washed with water, and stripped by distillation at 70° C./<1 mm. Hg. There was obtained 188 g. of yellow, very viscous residue which had the following properties: acidity=0.01 cc. of N base/g., salt=0.007 cc. of N HClO$_4$/g., percent Cl=25.49 (theory[1]=25.42), percent yield=89 (based on the diepoxy compound), percent P=7.55 (theory[1]=7.40).

A tetra-(2-chloroethyl) p,p'-ethylidenediphenoxy-di-(bromopropyl) diphosphate can also be prepared in this manner.

Example 4

A tetra-(2-chloroethyl) p-phenylenedioxy-di-(chloropropyl) diphosphate represented by the structural formula:

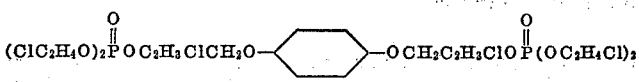

was prepared by the dropwise addition of a solution of 57 g. of the diglycidyl ether of hydroquinone (97.1% by epoxy analysis) and 100 cc. of ethylene dichloride to an agitated solution of 1.0 g. of titanium tetrachloride and 0.525 mol of di-(2-chloroethyl) chlorophosphate. It was necessary to cool the reaction mixture in order to maintain the temperature at 70° C. After the addition the reaction mixture was heated at 70° C. for 6 additional hours, neutralized using 1000 g. of 10% aqueous trisodium citrate, washed with water, and stripped by distillation at 70° C./<1 mm. Hg. There was obtained 159 g. of pale yellow, viscous residue product which had the following properties: acidity=0.03 cc. of N base/g., salt=0.003 cc. of N HClO$_4$/g., percent Cl=29.45 (theory[1]=29.92), percent yield=89 (based on the diepoxy compound), percent P=8.93 (theory[1]=8.72).

A tetra-(2-chloroethyl) p-phenylenedioxy-di-(bromopropyl) diphosphate can also be prepared in this manner.

Example 5

A tetra-(2-chloroethyl) m-phenylenedioxy-di-(chloropropyl) diphosphate represented by the structural formula:

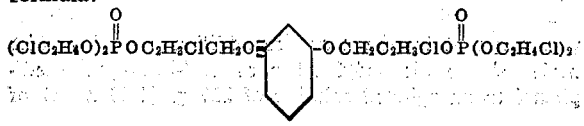

was prepared by the dropwise addition of 61 g. of the diglycidyl ether of resorcinol (90.8% by epoxy analysis) to an agitated solution of 1.0 g. of titanium tetrachloride and 0.525 mol of di-(2-chloroethyl) chlorophosphate. It was necessary to cool the reaction mixture throughout this addition in order to maintain the temperature at 70° C. After the addition the reaction mixture was heated at 70° C. for 6 additional hours, neutralized using 1000 g. of 10% aqueous trisodium citrate, washed with 200 cc. of water, and stripped by distillation at 60° C./<1 mm. Hg. The resulting 164 g. of yellow, viscous residue had the following properties: acidity=0.01 cc. of N base/g., salt=0.008 cc. of N HClO$_4$/g., percent Cl=28.99 (theory[1]=29.26), percent yield=90 (based on the diepoxy compound), percent P=8.81 (theory[1]=8.52).

A tetra-(2-chloroethyl) m-phenylenedioxy-di-(bromopropyl) diphosphate can also be prepared in this manner.

Example 6

A tetra-(2-chloroethyl) p,p'-sulfonyldiphenoxy-di-(chloropropyl) diphosphate represented by the structural formula:

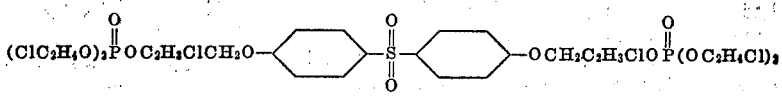

was prepared by the dropwise addition of 100 g. of the diglycidyl ether of 4,4'-dihydroxydiphenylsulfone (91% by epoxy analysis) dissolved in 400 cc. of ethylene dichloride to an agitated solution of 1.0 g. of titanium tetrachloride and 0.525 mol of di-(2-chloroethyl) chlorophosphate at a reaction temperature of 70° C. After the addition the reaction mixture was heated at 70° C. for 6 additional hours, neutralized using 1000 g. of 10% aqueous trisodium citrate, washed with 400 cc. of water, and stripped by distillation at 60° C./<1 mm. Hg. The resulting 193 g. of yellow, extremely viscous residue had the following properties: acidity=0.02 cc. of N base/g., salt=0.002 cc. of N HClO$_4$/g., percent Cl=25.19 (theory[1] 24.11), percent yield=87 (based on the diepoxy compound), percent P=7.15 (theory[1]=7.02).

A tetra-(2-chloroethyl) p,p'-sulfonyldiphenoxy-di-(bromopropyl) diphosphate can also be prepared in this manner.

Example 7

A tetra-(2-chloroethyl) p,p'-isopropylidenediphenoxy-di-(chloropropyl) diphosphate represented by the structural formula:

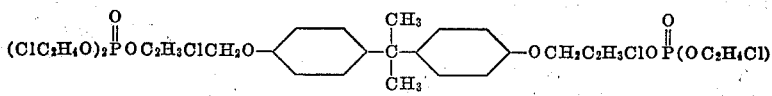

was prepared by the dropwise addition of 85 g. (0.25 mol) of the diglycidyl ether of p,p'-isopropylidenediphenol to a flask containing 1.0 g. of aluminum chloride and 127 g. (0.525 mol) of di-(2-chloroethyl) chlorophosphate over a period of 30 minutes. There was a heat of reaction observed throughout most of the addition and for 25 minutes afterward which necessitated cooling of the reaction mixture. After the addition the reaction mixture was heated at 70° C. for 5 additional hours, diluted with 100 cc. of ethylene dichloride, neutralized using 300 g. of 10% aqueous trisodium citrate, washed with 200 cc. of water, and stripped by distillation at 100° C./<1 mm. Hg. The 179 g. of viscous liquid product had the following properties: acidity=0.006 cc. of N base/g., salt=0.01 cc. of N HClO₄/g., percent Cl=25.09 (theory=25.83), percent yield=87 (based on the diepoxy compound).

A tetra-(2-chloroethyl) p,p'-sulfonyldiphenoxy-di-(bromopropyl) diphosphate can also be prepared in this manner.

*Example 8*

A tetra-(2-chloroethyl) p,p'-isopropylidenediphenoxy-di-(chloropropyl) diphosphate represented by the structural formula:

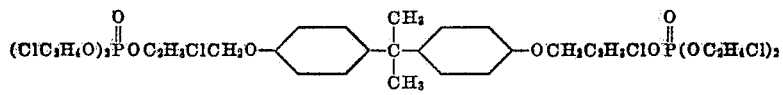

was prepared by the dropwise addition of 85 g. (0.25 mol) of the diglycidyl ether of p,p'-isopropylidenediphenol to a reaction flask containing 1.0 g. of zirconium tetrachloride and 127 g. (0.525 mol) of di-(2-chloroethyl) chlorophosphate over a period of 15 minutes. It was necessary to cool the reaction mixture in order to maintain the temperature at 70° C. After the addition the reaction mixture was heated at 70° C. for 1.75 hours, neutralized using 300 g. of 10% aqueous trisodium citrate, washed with water, and stripped by distillation at 100° C./<1 mm. Hg. The 168 g. of viscous liquid product had the following properties: acidity=0.08 cc. of N base/g., salt=0.01 cc. of N HClO₄/g., percent Cl=23.38 (theory=25.83), percent yield=82 (based on the diepoxy compound), percent P=6.64 (theory=7.53).

A tetra-(2-chloroethyl) p,p'-isopropylidenediphenoxy-di-(bromopropyl) diphosphate can also be prepared in this manner.

*Example 9*

A tetra-(2-chloroethyl) p,p'-isopropylidenediphenoxy-di-(chloropropyl) diphosphate represented by the structural formula:

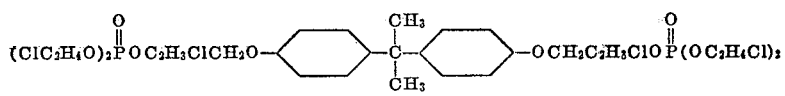

was prepared by the dropwise addition of 85 g. (0.25 mol) of the diglycidyl ether of p,p'-isopropylidenediphenol to an agitated solution of 1.0 g. of titanium tetrachloride and 127 g. (0.525 mol) of di-(2-chloroethyl) chlorophosphate. It was necessary to cool the reaction mixture throughout the addition in order to maintain the temperature at 70° C. After the addition the reaction mixture was heated at 70° C. for 8 additional hours, neutralized using 300 g. of 10% aqueous trisodium citrate, diluted with 250 cc. of ethyl ether, washed with two 100 cc. portions of water, and stripped by distillation at 100° C./<1 mm. Hg. There was obtained 185 g. of yellow, viscous residue which had the following properties: acidity=0.10 cc. of N base/g., salt=0.0004 cc. of N HClO₄/g., percent Cl=24.44 (theory=25.83) and percent yield=90 (based on the diepoxy compound).

*Example 10*

A tetraphenyl p,p'-isopropylidenediphenoxy-di-(chloropropyl) diphosphate represented by the structural formula:

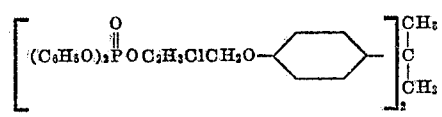

was prepared by the dropwise addition of 42.5 g. (0.125 mol) of the diglycidyl ether of p,p'-isopropylidenediphenol to an agitated solution of 67 g. (0.25 mol) of diphenyl chlorophosphate and 1.0 g. of titanium tetrachloride over a period of 15 minutes. It was necessary to cool the reaction mixture throughout the addition in order to maintain the reaction temperature at 70° C.

After the addition the reaction mixture was kept at 70° C. for an additional 1 hour. The reaction mixture was diluted with 100 cc. of benzene, neutralized using 300 g. of 10% aqueous trisodium citrate, washed with water, and stripped by distillation at 100° C./<2 mm. Hg. The resulting 99 g. of residue was dissolved in 200 cc. of ethyl ether and washed with dilute aqueous sodium hydroxide, then with sodium bicarbonate solution, and finally washed with until neutral toward litmus paper. The washed ethereal solution was stripped by distillation at 100° C./<2 mm. Hg. There was obtained 76 g. of very viscous, yellow liquid residue which had the following properties: percent Cl=8.07 (theory=8.08), percent P=6.74 (theory=7.06), percent C=61.37 (theory=61.52), percent H=5.52 (theory=5.06), percent yield=69, salt=nil, $n_D^{30}$=1.5729.

*Example 11*

A 2,2' - [p,p' - isopropylidenediphenoxy - di - (chloropropoxy)] bis(5,5 - diethyl - 2 - oxo - 1,3,2 - dioxaphosphorinane) represented by the structural formula:

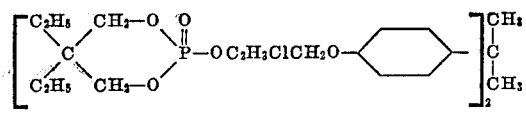

was prepared by the dropwise addition of 170 g. (0.5 mol) of the diglycidyl ether of p,p'-isopropylidenediphenol to an agitated solution of 223 g. (1.05 mols) of 2 - chloro - 5,5 - diethyl - 2 - oxo - 1,3,2 - dioxaphosphorinane and 4.0 g. of titanium tetrachloride over a period of 45 minutes. It was necessary to cool the reaction mixture throughout most of this addition in order to maintain the kettle temperature at 70° C. The reaction mixture became so viscous during this addition that 100 cc. of ethylene dichloride was added. After the addition was complete the reaction mixture was heated at 70° C. for 8 additional hours, neutralized by stirring at 25° C. for 1 hour with a solution of 26.6 g. of sodium hydroxide dissolved in 80 cc. of water, washed twice with 250 cc. portions of water, and stripped by distillation at 100° C./2 mm. Hg. There was obtained 270 g. of yellow, glassy residue product which had the following properties: acidity=0.004 cc. of N base/g., percent Cl=9.97 (theory=9.27), salt=0.01 cc. of N HClO₄/g., percent P=7.85 (theory=8.09), percent C=54.25 (theory=54.9), percent H=6.57 (theory=6.84), molecular weight=720 (theory=765.6), percent yield=70.

A 2,2' - [p,p' - isopropylidenediphenoxy - di - (bromopropoxy)] bis(5,5 - diethyl - 2 - oxo - 1,3,2 - dioxaphosphorinane) can also be prepared in this manner.

*Example 12*

A 2,2' - [p,p' - isopropylidenediphenoxy - di - (chloropropoxy)] bis(5 - ethyl - 2 - oxo - 4 - propyl - 1,3,2 - dioxaphosphorinane) represented by the structural formula:

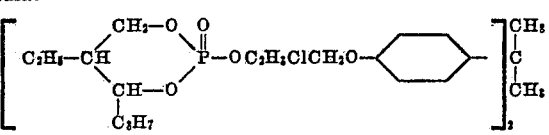

was prepared by the dropwise addition of 170 g. (0.5 mol) of the diglycidyl ether of p,p'-isopropylidenediphenol to an agitated solution of 237 g. (1.05 mols) of 2 - chloro - 5 - ethyl - 2 - oxo - 4 - propyl - 1,3,2 - dioxaphosphorinane and 4.0 g. of titanium tetrachloride over a period of 45 minutes. It was necessary to cool the reaction mixture throughout the addition in order to maintain the kettle temperature at 70° C. After the addition the reaction mixture was heated at 70° C. for 6 additional hours and allowed to stand over the weekend at 25° C. The reaction mixture was stirred for 2 hours at 25° C. with a solution of 600 g. of 15% aqueous trisodium citrate and then washed with water until it was neutral toward litmus paper. Upon stripping the washed product by distillation at 100° C./2 mm. Hg. there was obtained 373 g. of light orange, tacky residue which had the following properties: acidity=0.17 cc. of N base/g., salt=0.03 cc. of N $HClO_4$/g., percent Cl=9.43 (theory=8.94), percent C=54.21 (theory=56.0), percent H=7.0 (theory=7.12), percent P=7.99 (theory=7.80), molecular weight=740 (theory=793.7), percent yield=94.

A 2,2' - [p,p'-isopropylidenediphenoxy - di - (bromopropoxy)] bis(5 - ethyl - 2 - oxo - 4 - propyl - 1,3,2 - dioxaphosphorinane) can also be prepared in this manner.

*Example 13*

A 2,2' - [p,p' - isopropylidenediphenoxy - di - (chloropropoxy)] bis(4 - methyl - 2 - oxo - 1,3,2 - dioxaphosphorinane) represented by the structural formula:

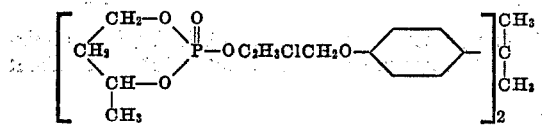

was prepared by the dropwise addition of 170 g. (0.5 mol) of the diglycidyl ether of p,p'-isopropylidenediphenol to an agitated solution of 179 g. (1.05 mols) of 2 - chloro - 4 - methyl - 2 - oxo - 1,3,2 - dioxaphosphorinane and 4.0 g. of titanium tetrachloride over a period of 45 minutes. It was necessary to cool the reaction mixture throughout the addition in order to maintain the kettle temperature at 70° C. After the addition the reaction mixture was stirred at 25° C. for 2 hours with 600 g. of 15% aqueous sodium citrate, washed with water until neutral toward litmus paper, and stripped by distillation at 100° C./2 mm. Hg. There was obtained 310 g. of reddish-brown, very viscous residue which had an acidity=0.25 cc. of N base/g. This 310 g. of product was dissolved in ethylene dichloride, neutralized by stirring at 25° C. for 2 hours with a solution of 10 g. of sodium hydroxide in 20 g. of water, washed 3 times with 200 cc. portions of water, and stripped by distillation at 100° C./2 mm. Hg. The resulting 190 g. of dark yellow, very viscous product had the following properties: acidity=0.009 cc. of N base/g., salt=0.03 cc. of N $HClO_4$/g., percent Cl=11.57 (theory=10.41), percent P=8.33 (theory=9.09), molecular weight=683 (theory=681.5), percent yield=56.

A 2,2' - [p,p' - isopropylidenediphenoxy - di - (bromopropoxy)] bis(4 - methyl - 2 - oxo - 1,3,2 - dioxaphosphorinane) can also be prepared in this manner.

The compounds of this invention are neutral esters which are useful as hydraulic fluids, dye assistants, insecticides and as plasticizers for vinyl resins. They are also useful as plasticizers for cellulose acetate resins. In order to demonstrate the compatibility of the compounds of the present invention with cellulose acetate, several of the compounds were separately tested as follows:

One half gram of commercial cellulose acetate which had been thoroughly dried at 50° C. was mixed in a 20 mm. x 120 mm. test-tube with two grams of the compound to be tested. The test-tube was then placed in a 200° C. heating bath for fifteen minutes. The appearance of the mixture was observed while it was at 200° C. and after it had cooled to room temperature.

The compounds which were tested in the above manner were: tetra-(2-chloroethyl) p,p'-2-butylidenediphenoxy-di-(chloropropyl) diphosphate; tetra-(2-chloroethyl) p - phenylenedioxy - di-(chloropropyl) diphosphate and tetra - (2-chloroethyl) p,p'-sulfonyldiphenoxy-di-(chloropropyl) diphosphate, prepared, respectively in Examples 2, 4 and 6. Each of the compounds tested resulted in a mixture which was clear and colorless both at 200° C. and after cooling to room temperature.

What I claim is:

1. A haloalkyl aryl diphosphate having the formula:

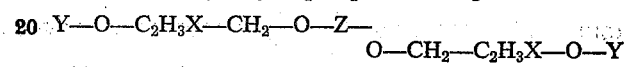

in which X is a halogen atom selected from the group consisting of chlorine and bromine, Z is a member selected from the class consisting of p,p'-lower alkylidenediphenyl, phenylene and p,p'-sulfonyldiphenyl radicals and Y is a phosphorus containing radical selected from the class consisting of

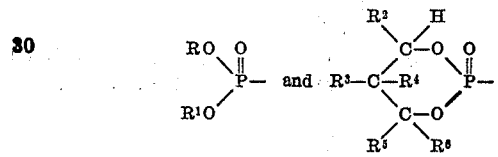

wherein R and $R^1$ are members selected from the class consisting of lower alkyl, lower chloroalkyl, lower bromoalkyl and monocyclic aryl radicals and $R^2$ through $R^6$ are members selected from the class consisting of hydrogen and lower alkyl groups.

2. A haloalkyl aryl diphosphate having the formula:

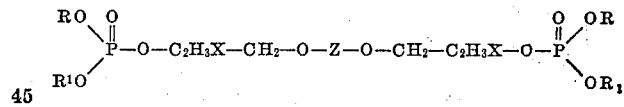

in which X is a halogen atom selected from the group consisting of chlorine and bromine, Z is a member selected from the class consisting of p,p'-lower alkylidenediphenyl, phenylene and p,p'-sulfonylidphenyl radicals and R and $R^1$ are members selected from the class consisting of lower alkyl, lower chloroalkyl, lower bromoalkyl and monocyclic aryl radicals.

3. A haloalkyl aryl diphosphate having the formula:

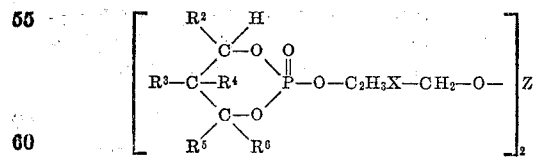

in which X is a halogen atom selected from the group consisting of chlorine and bromine, Z is a member selected from the class consisting of p,p'-lower alkylidenediphenyl, phenylene and p,p'-sulfonyldiphenyl radicals and $R^2$ through $R^6$ are members selected from the class consisting of hydrogen and lower alkyl groups.

4. A tetrabutyl p,p'-isopropylidenediphenoxy-di-(chloropropyl) diphosphate represented by the structural formula:

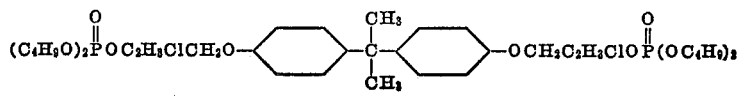

5. A tetra-(2-chloroethyl) p,p'-2-butylidene-diphenoxy-di-(chloropropyl) diphosphate represented by the structural formula:

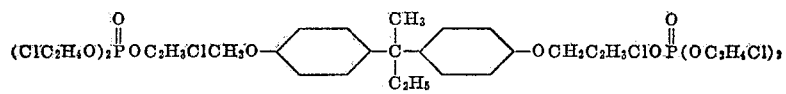

6. A tetra-(2-chloroethyl) p,p'-ethylidenediphenoxy-di-(chloropropyl) diphosphate represented by the structural formula:

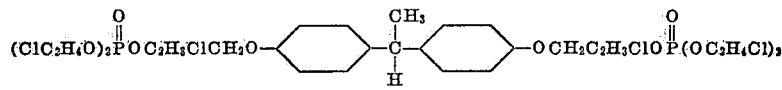

7. A tetra-(2-chloroethyl) p-phenylenedioxy-di-(chloropropyl) diphosphate represented by the structural formula:

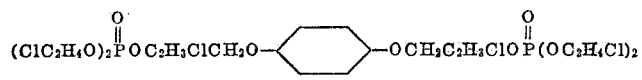

8. A tetra-(2-chloroethyl) m-phenylenedioxy-di-(chloropropyl) diphosphate represented by the structural formula:

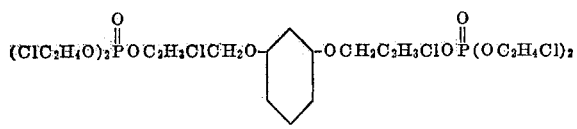

9. A tetra-(2-chloroethyl) p,p'-sulfonyldiphenoxy-di-(chloropropyl) diphosphate represented by the structural formula:

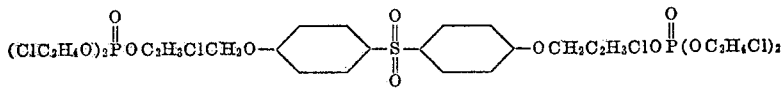

10. A 2,2' - [p,p'-isopropylidenediphenoxy-di-(chloropropoxy)] bis(5,5 - diethyl - 2-oxo-1,3,2-dioxaphosphorinane) represented by the structural formula:

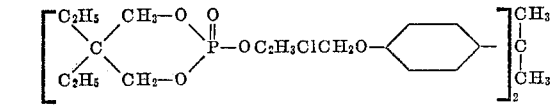

11. A tetraphenyl p,p'-isopropylidenediphenoxy-di-(chloropropyl) diphosphate represented by the structural formula:

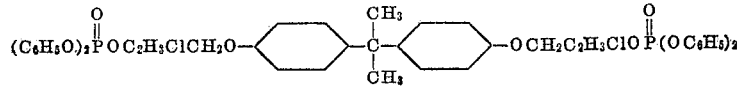

12. A 2,2' - [p,p'-isopropylidenediphenoxy-di-(chloropropoxy)] bis(5 - ethyl-2-oxo-4-propyl-1,3,2-dioxaphosphorinane) represented by the structural formula:

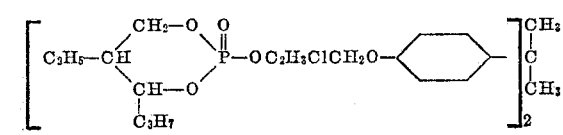

13. A 2,2'- [p,p'-isopropylidenediphenoxy-di-(chloro-

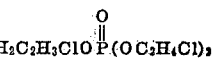

propoxy)] bis(4-methyl-2-oxo-1,3,2-dioxaphosphorinane) represented by the structural formula:

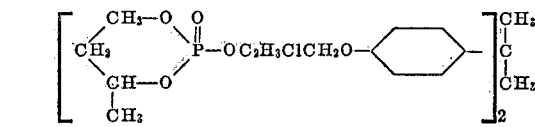

14. The process which comprises bringing into admixture at a temperature of from about −10° C. to about 125° C. a diepoxy compound represented by the formula:

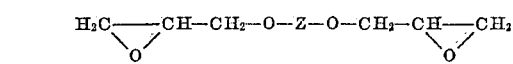

with a disubstituted monohalophosphate represented by the formula YX, wherein X is a halogen atom selected from the group consisting of chlorine and bromine, Z is a member selected from the class consisting of p,p'-lower alkylidenediphenyl, phenylene and p,p'-sulfonyldiphenyl radicals and Y is a phosphorus-containing radical selected from the class consisting of

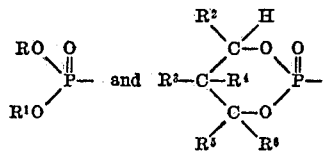

wherein R and $R^1$ are members selected from the class consisting of lower alkyl, lower chloroalkyl, lower bromoalkyl and monocyclic aryl radicals and $R^2$ through $R^6$ are members selected from the class consisting of hydrogen and lower alkyl groups.

No references cited

UNITED STATES PATENT OFFICE
Certificate of Correction

March 31, 1959

Patent No. 2,880,225

William M. Lanham

It is hereby certified that error appears in the printed specification of the above numbered patent requiring correction and that the said Letters Patent should read as corrected below.

Column 1, line 62, for "di-chloropropyl)" read —di-(chloropropyl)—; column 4, line 74, in the footnotes for "7 6 grams" read —7.6 grams—; column 5, line 73, Example 5, for that portion of the formula reading

column 6, line 59, Example 7, right-hand portion of the formula, for "$(OC_2H_4Cl)$" read —$(OC_2H_4Cl)_2$—; column 8, line 9, after "with" insert —water—; column 10, line 49, for "p,p'-sulfonylidphenyl" read —p,p'-sulfonyldiphenyl—.

Signed and sealed this 8th day of December 1959.

[SEAL]

Attest:
KARL H. AXLINE,
*Attesting Officer.*

ROBERT C. WATSON,
*Commissioner of Patents.*